ELUTION CHROMATOGRAPHY PROCESS WITH GRADIENT

United States Patent Office

3,835,043
Patented Sept. 10, 1974

3,835,043
MINIMIZING ELUTION VOLUMES IN LIQUID CHROMATOGRAPHIC SEPARATIONS
Paul R. Geissler, Edison, and Frank J. Healy, Morristown, N.J., assignors to Esso Research and Engineering Company
Filed Dec. 21, 1972, Ser. No. 317,118
Int. Cl. B01d 15/08
U.S. Cl. 210—31 C — 9 Claims

ABSTRACT OF THE DISCLOSURE

In a liquid chromatography commercial process for the separation of two or more components contained in admixture in a feedstream including the steps of (a) contacting the feedstream mixture containing the components to be separated with a bed of crystalline aluminosilicate adsorbent at conditions to effect the selective retention of two or more of the components by said adsorbent, (b) passing through said bed an eluent selected from the group consisting of aromatics and substituted aromatics, (c) recovering from said bed a stream or streams containing at least a portion of the less selectively adsorbed components, and (d) recovering a stream substantially enhanced in concentration of said selectively adsorbed components relative to other components of feedstream wherein the improvement comprises increasing the strength of the eluting agent in the liquid carrier during the operation of the steps (a) and (b) above to thereby effect the desired separation under conditions that cause low elution volume to feed ratios. The improved liquid chromatography process is particularly applicable to the separation of paraxylene and ethylbenzene from a $C_8$ aromatic isomer mixture containing ethylbenzene.

FIELD OF THE INVENTION

Figure 1:
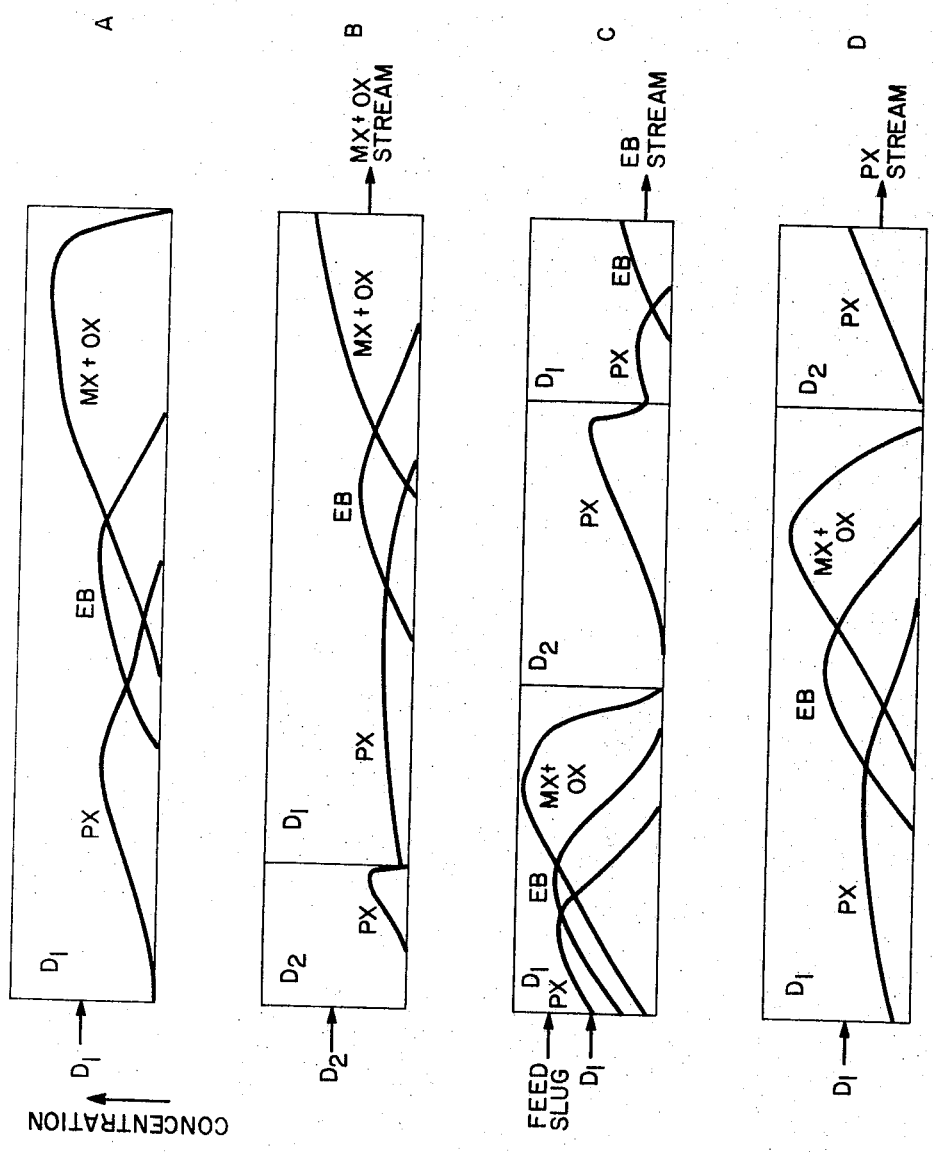

This invention relates to an improvement in the operation of commercial liquid chromatographic separation processes of mixtures into two or more components. More particularly, the invention relates to an improved elution chromatographic separation process carried out in either two columns or in a single column. The separation of a $C_8$ aromatic isomer mixture is particularly adaptable to the operation of the present invention.

BACKGROUND OF THE INVENTION

In the liquid chromatographic separation of mixtures into two or more components on a commercial scale, it is economically desirable to operate under conditions that maintain low elution volume to feed ratios. The reason for this is mainly due to the cost involved in distilling the carrier and eluent from the feed components after they have been eluted from the chromatographic column; this cost increasing as the elution volume to feed ratio increases. One of the main causes of high elution volumes in these processes is related to the phenomena that peaks which are eluted last from the column have larger half widths than those eluted early.

Chromatography is a process whereby components contained in a fluid mixture may be separated from the mixture. This is accomplished by the selective retardation of one or more of the components of the fluid mixture as the fluid uniformly moves through a column containing a stationary substrate. The retarding results from the distribution of the components of the mixture between the substrate and the bulk fluid as the fluid moves past the stationary phase.

One of the particular chromatographic methods employed is called elution chromatography. In this technique, the feed mixture and carrier fluid and eluent are passed sequentially through the column. In this specification, carrier fluid is taken as liquid materials which are not significantly adsorbed by the substrate in the presence of feed mixture components. Eluent is a term to describe liquid materials which are adsorbed by the substrate and compete for adsorption sites with the feed components. This sequential passage of carrier-eluent and feed leads to a differential migration of the feed's components according to their distribution between two phases. If the components of the sample have different distribution coefficients, a separation of the components is achieved as the components will elute in sequence from the end of the stationary phase. In ordinary elution development, there is only a small range of retention volumes or retardation factors for optimum separation. The distribution coefficients must be sufficiently large so that the components eluted early are not pushed off the column as an unresolved series of bands, yet the distribution coefficients must be reasonably small if excessive elution times and some peak broadening are to be avoided. In addition, there must be a difference in the distribution coefficients of the components in order to effect their separation.

A technique herein described of gradient elution development permits an automatic gradual attainment of the eluting power required for each component. In gradient elution, the chromatogram development may be characterized by the intentional variation of eluting conditions during the course of separation which include composition of the multiple phase, column pressure, and column temperature. In liquid column chromatography, adjustment of the composition of the eluent carrier fluid is an approach most easily achieved.

DESCRIPTION OF THE PRIOR ART

It is known in the separation art that certain adsorbents generally comprising crystalline aluminosilicates can be utilized to separate certain hydrocarbons from feed mixtures. In aromatic hydrocarbons separation, in particular the separation of the $C_8$ aromatic hydrocarbons, it is generally recognized that particular crystalline aluminosilicates are useful for a given $C_8$ aromatic hydrocarbon. Illustrative of the prior art is Neuzil, 3,558,732, which teaches an improved adsorptive separation process, the improvement comprising employing toluene as a desorbent.

Other art workers have taught the use of different kinds of X and Y type zeolites for the separation of paraxylene from a mixture of $C_8$ aromatic isomers, see for example, Neuzil 3,626,020. In U.S. 3,636,121 to Stine et al., a dual adsorption and isomerization process for the recovery and isomerization of various $C_8$ aromatic isomers is described and diethylbenzene is the eluent preferred for operation of the process.

SUMMARY OF THE INVENTION

The present invention is primarily concerned with an improved one column, liquid chromatographic separation process for $C_8$ aromatic mixtures. The process is directed to the ultimate recovery of pure paraxylene or paraxylene and ethylbenzene in purities exceeding 99% and in which 90% of the paraxylene introduced as feed is recovered. The process utilizes Y type zeolites, such as potassium exchanged type Y (KY), potassium-ammonium-exchanged type Y (ammonium KY) and barium-potassium-exchanged type Y. These sieves are prepared in the typical changed type Y. These sieves are prepared in the typical cation exchange techniques described in U.S. 3,696,107 which is herein incorporated by reference. These sieves are also described in copending application Serial No. 282,983, herein incorporated by reference. KY sieve is preferred when either p-xylene alone or p-xylene and ethylbenzene are sought as products, and the process includes the utilization of the typical process steps employed in liquid elution chromatographic processes, such as contacting the feed mixture with, e.g., a KY sieve under conditions to effect the preferential adsorption of paraxylene and ethylbenzene; contacting the bed of KY sieve containing selectively adsorbed paraxylene and ethylbenzene with a carrier-eluent mixture to thereby effect the desorption of adsorbed components from the bed material; recovering from the bed containing said KY sieve, a stream or streams containing metaxylene, orthoxylene, paraxylene, ethylbenzene and mixtures thereof, and ultimately recovering paraxylene and ethylbenzene as product streams.

The gradient elution concept of the present invention provides a means for reducing the total elution volume to feed ratio by condensing the overall chromatogram that results from the selective separation of the $C_8$ aromatic isomers in the mixture. This gradient elution concept is carried out in one of three ways; the eluent concentration in the carrier-eluent is increased in a step-wise manner with time, or there is a continuous increase in the eluent concentration in the carrier-eluent with time, as the feed slug proceeds through the bed. In a third, but less preferred method, gradient elution is carried out by the substitution of a week eluent by a strong eluent during the elution of the feed components; this substitution can be conducted in either the step-wise or continuous manner as described above. The present improved process resulting in reduced total elution volumes by the gradient techniques as described above is directed to the recovery of both ethylbenzene and paraxylene product streams.

It has been discovered that increasing desorbent to fresh feed ratio also increases the amount of ethylbenzene recovered. Hence, in another embodiment the process is operated with recycle in the range of 0 up to about 100%, on a fresh feed basis, resulting in a recovery of ethylbenzene from about 20% up to about 80%. Additionally, it has been discovered that an improved method of recycling the unseparated components may be carried out by eliminating the necessity of distilling the recycle slug to separate out xylenes. It has been shown there is no significant effect, when the carrier-eluent is allowed to remain in the recycle slug along with the recycled xylenes, upon the subsequent feed slug to be separated. This embodiment effects a significant savings in operating costs for the overall process since the amount of distillation required is reduced significantly.

It has also been discovered and is therefore another embodiment of the present invention that the utilization of meta-diisopropylbenzene, i.e., m-DIPB as an eluting agent in the carrier-eluent stream comprising from 10 to 100% of the metadiisopropylbenzene significantly increases the separability of ethylbenzene peak from the paraxylene peak, when compared with similar systems in which orthodichlorobenzene, i.e., ODCB or toluene is used as the eluent. This eluting agent may be used in combination with any inert diluent utilized as a carrier such as a n-dodecane and the like. Typically it is employed in amounts of from about 25% m-DIPB and 75% n-dodecane. However, in the operation of the gradient elution embodiment, the beginning 25% concentration of the eluting agent in the carrier-eluent is increased by any of the methods described above to a final concentration of up to about 95% in said carrier-eluent stream.

The present invention is operable under a wide range of conditions; for example, pressures are not critical and the present process may be operated at pressures in the range of from 0.1 to 50 atmospheres, preferably from .1 to 10 atmospheres, most preferably from 1 to 5 atmospheres.

Applying the present invention to commercial liquid chromatographic separations of $C_8$ aromatic isomers, the particular conditions employed such as optimum feed slug size, eluent, length of column, temperature, sieve, etc., will vary from case to case. In general, however, the temperatures will be in the range of from 25 to 200° C., more preferably from 75 to 160° C., and most preferably from 90 to 145° C. Normally, the process is operated isothermally, and any increase in the operating temperature generally decreases elution volume but at a sacrifice of peak separation.

Additionally, the present process is operable without recycle or with recycle which is defined as the amount of recycle divided by the fresh feed times 100; said recycle will be in the range of from 10 to 100%, preferably from about 10 to about 75%.

Additionally, the process while in a preferred manner, is described as an improvement for the single column scheme; the operations of the various embodiments described herein are also useful as an improvement over the two-column scheme defined in copending application Ser. No. 282,983, wherein critical feed slug sizes are utilized of from at least twice, preferably at least four times the maximum feed slug employed to obtain three pure components in a single column scheme.

Additionally, while m-DIPB is herein described as a preferred eluting agent, the present process is also operable with eluting agents such as ODCB and other eluting agents such as are adequately described in copending application Ser. No. 282,983.

In a typical processing scheme, the gradient elution technique for increasing the strength of the eluting agent in the liquid carrier is carried out, for example, by increasing in a step-wise manner from 25 to 50%, the amount of eluting agent when same is ODCB and 25% to 95% when same is m-DIPB, whichever the case may be, in the n-dodecane hydrocarbon carrier.

The process is carried out by utilizing a column containing a KY sieve through which is passed a carrier-eluent composed of 20% m-DIPB-80% n-dodecane, at a linear velocity of 0.3 feet/minute, and a column temperature of 130° C. Carrier-eluent flow is stopped after the column has been sufficiently purged and a feed slug composed of 20% p-xylene, 20% o-xylene, 20% ethylbenzene and 40% m-xylene is injected into the column. The chromatogram development showing the separation of the components is illustrated FIG. 1. After feed slug injection, carrier-eluent ($D_1$) flow is immediately resumed; the composition of the carrier-eluent stream is changed to $D_2$ in a step-wise manner by means of a three-port, two-way valve from a separate storage vessel containing 100% n-DIPB. The change in composition of the carrier-eluent stream to $D_2$, containing higher concentrations of eluent than $D_1$, is effected at a definite time period after the column composition profile of FIG. 1A is obtained. The effect of $D_2$ on the elution development of the feed slug in the column is illustrated in FIG. 1B and it is shown that p-xylene is eluted (desorbed) more quickly, while m-xylene and o-xylene are removed as product stream. A definitive volume of $D_2$ is passed through the column and is followed by subsequent feed slug injection including utilization of carrier-eluent stream $D_1$. The profile of the column composition as shown in FIG. 1C illustrates the removal of ethylbenzene as a product stream; FIG. 1D shows p-xylene removed as product stream together with desorbent $D_2$. The definite time period referred to above, where $D_1$ is changed to $D_2$, is a function of temperature, flow column size, desorbent, and sieve. Said time period must be chosen such that the p-xylene peak elutes from the column predominately in the presence of desorbent $D_2$.

When the gradient elution technique is being utilized by means of a continuous increase in the concentration of the eluting agent in the carrier-eluent stream, a typical processing scheme will be carried out similar to the scheme described above except that instead of step-wise transition from $D_1$ to $D_2$; the initial composition of carrier-eluent $D_1$ is changed continuously until composition $D_2$ is obtained. This may be carried out by conventional means such as the use of a mixing tee and varying flow rates of two streams $D_1$ and $D_2$ to produce any desired change from $D_1$ to $D_2$.

The third gradient elution method or substitution technique is conducted similar to the schemes described above except that $D_2$ is 25–100% of a strong eluent such as ODCB while $D_1$ is 25–100% of a weak eluent such as m-DIPB.

Figure 2:
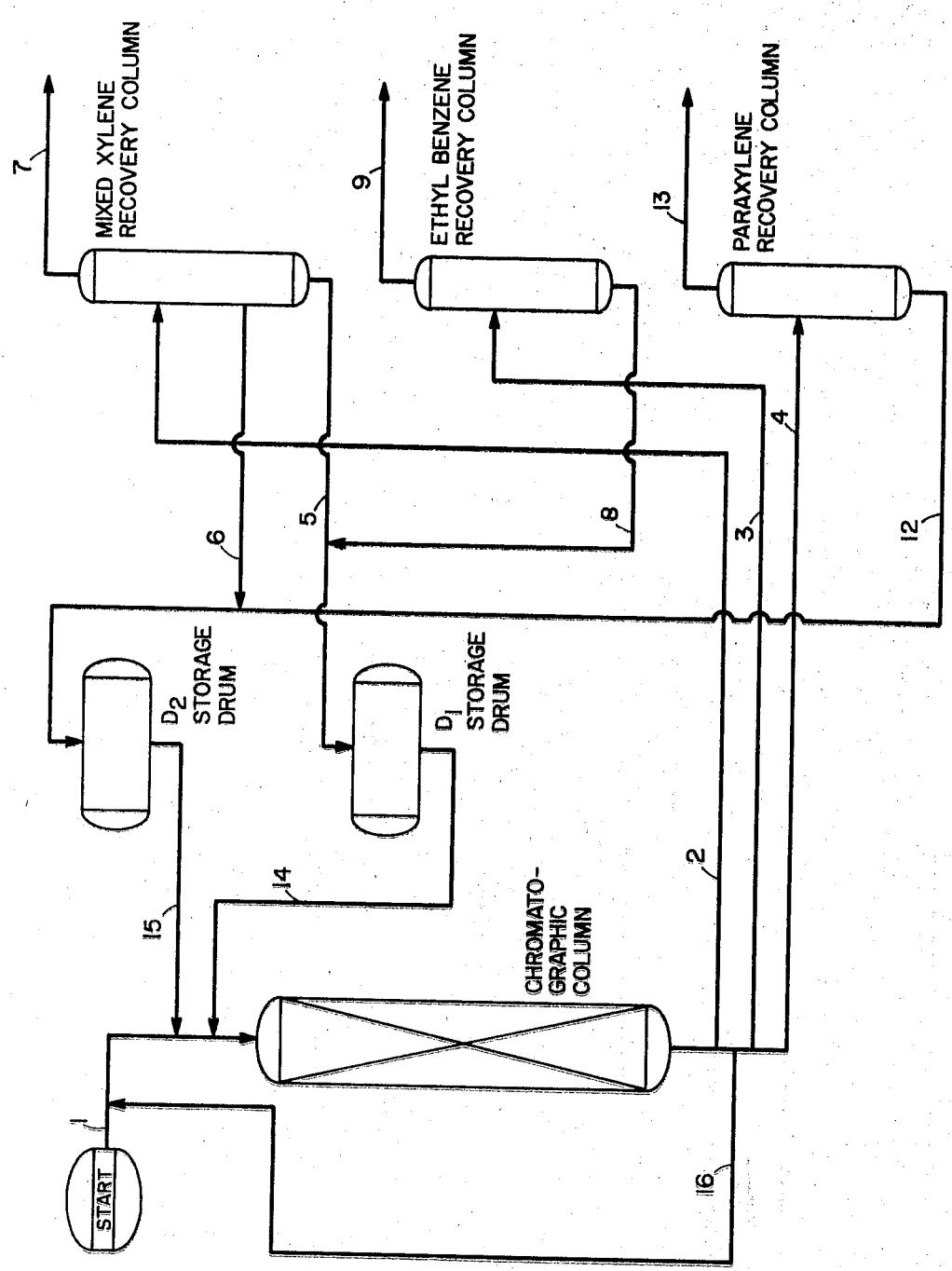

The present invention will be more easily understood by reference to FIG. 2.

In FIG. 2, representing a typical commercial-scale application of the invention, the feed slug, stream 1, is introduced into a chromatographic column. The feed slug is followed by weak desorbent, stream 14. Next, the weak desorbent is followed by strong desorbent, stream 15. The strong desorbent is introduced at such a time and for such a duration that the most strongly held component of the feed (i.e. paraxylene) is eluted in a stream containing essentially only strong desorbent. Product recovery is achieved by directing the eluted streams to separate fractionation facilities. Stream 2 (first cut) is fractionated into a mixed xylene product (Stream 7), a weak desorbent bottoms (Stream 5) and a strong desorbent sidestream (Stream 6). The desorbent streams are sent to storage drums for reuse. Stream 3 (second cut) is fractionated into ethylbenzene product (Stream 9) and a weak desorbent bottoms (Stream 8). Stream 4 is fractionated into paraxylene product (Stream 13) and a strong desorbent bottoms (Stream 12). For the fractionation scheme shown, both the weak and strong desorbents must have higher boiling points than the products, and the strong desorbent must have a lower boiling point than the weak desorbent. This is true for 100% metadiisopropylbenzene as the strong desorbent and a mixture of metadiisopropylbenzene and tridecane as the weak desorbent. If increased ethylbenzene recovery is desired, an additional product is taken (Stream 16), which contains ethylbenzene admixed with other $C_8$ aromatics, and is recycled to the column with fresh feed.

To further illustrate the improved process of the present invention, the following examples are provided; however, it is to be understod that the details thereof are not to be regarded as limitations, as they may be varied as will be understood by one skilled in the art.

Figure 3:
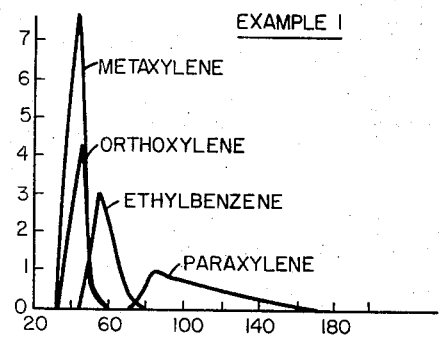
Figure 3:
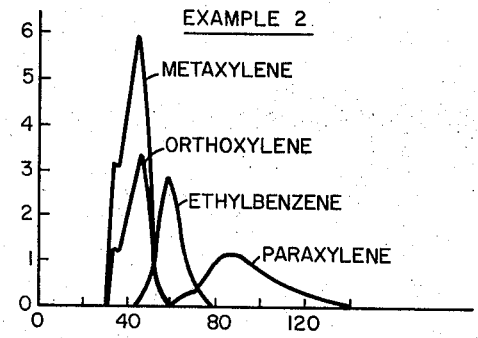
Figure 3:
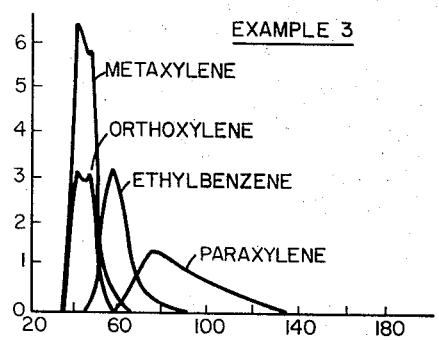
Figure 3:
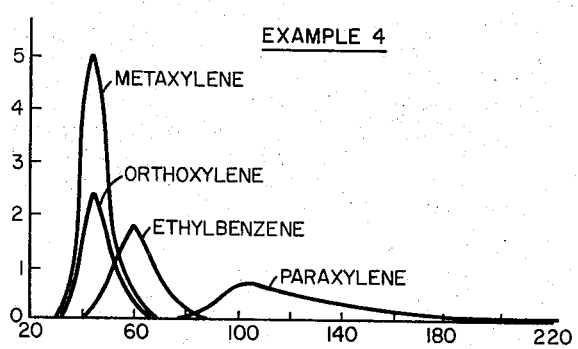
Figure 3:
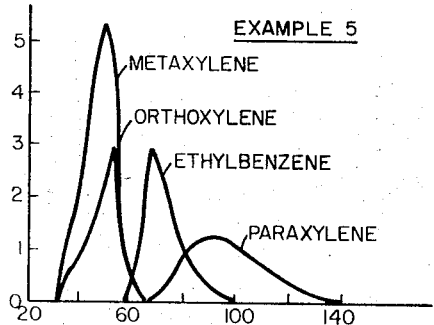
Figure 3:
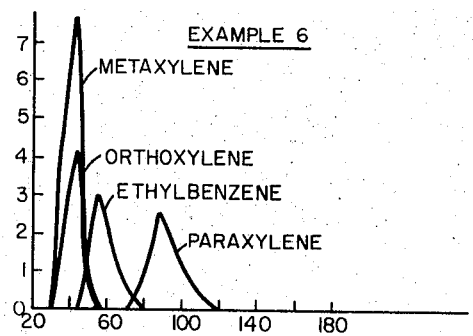
Figure 3:
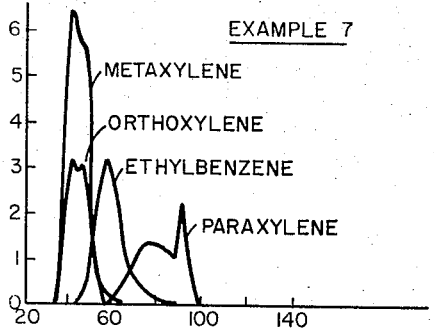
Figure 3:
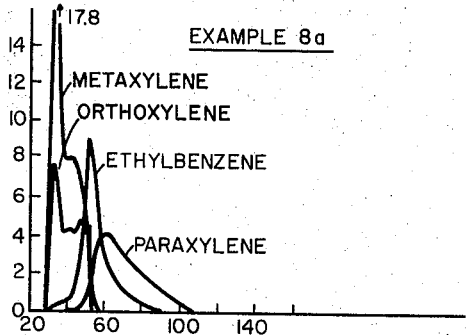
Figure 3:
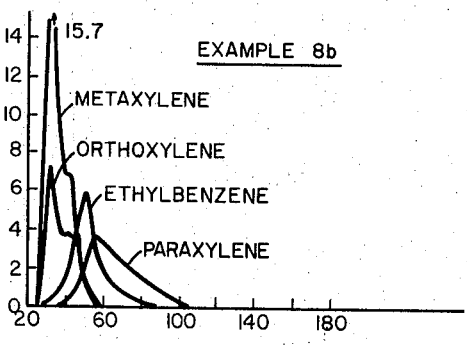

EXAMPLE 1 (See FIG. 3)

Potassium Y sieve was ground to 20–40 mesh and about 30 grams were loaded into a 9 foot long, 0.25″ O.D. 0.18″ I.D. stainless steel column. A carrier-eluent mixture of 25% m-DIPB and 75% n-$C_{12}$ paraffin was fed through the column at 130° C. at a constant flow rate of 1.5 cc. per minute. The carrier-eluent flow was stopped and a 2.0 cc. sample of 20% paraxylene, 20% ethylbenzene, 20% orthoxylene and 40% metaxylene was injected into the system upstream of the packed column through a six-port sample loop valve. Carrier-eluent flow was restarted immediately and samples of the stream eluting from the end of the column were taken periodically. Each sample was analyzed for the weight percentage of the $C_8$ aromatics by gas chromatography. The results are shown graphically in FIG. 3 depicting the elution of the various $C_8$ aromatic isomers as a function of elution volume. Results show that pure ethylbenzene (free of other $C_8$ isomers) was recovered between 58 and 68 cc. elution volume and that the total elution volume for the $C_8$ aromatic isomers was 140 cc.

EXAMPLE 2 (See FIG. 3)

The procedure of Example 1 was repeated, except that 20% toluene—80% n-$C_{12}$ paraffin was the eluent carrier mixture. Results show that the amount of recovered ethylbenzene was decreased relative to Example 1, that the total elution volume was 110 cc., and that the ethylbenzene and paraxylene peaks overlapped more than in Example 1 causing a lowered recovery of paraxylene.

EXAMPLE 3 (See FIG. 3)

The procedure of Example 1 was repeated except that 25% ODCB—75% n-$C_{12}$ paraffin was the carrier-eluent mixture. Results show that no pure ethylbenzene was recovered, that the total elution volume was 100 cc., and that the ethylbenzene and paraxylene peaks overlapped more than either Examples 1 or 2.

EXAMPLE 4 (See FIG. 3)

The procedure of Example 1 was repeated, except an ammonium potassium Y sieve prepared by exchanging sodium Y sieve with an aqueous mixture of ammonium and potassium salts was used. Results show that less pure ethylbenzene was recovered than in Example 1 and that the total elution volume was increased from 140 cc. of Example 1 to 185 cc.

EXAMPLE 5 (See FIG. 3)

The procedure of Example 3 was repeated except that the same ammonium potassium Y sieve of Example 4 was used. Results show that very little pure ethylbenzene was recovered, that the total elution volume was slightly increased from 100 cc. in Example 3 to 110 cc., and that the paraxylene-ethylbenzene overlap was unchanged.

EXAMPLE 6 (See FIG. 3)

The procedure of Example 1 is repeated except that 100% m-DIPB is substituted for 25% m-DIPB—75% n-$C_{12}$ paraffin in the carrier mixture 20 minutes after the feed is injected. Results show that the amount of ethylbenzene recovered is the same as in Example 1 and that the total elution volume is decreased to 90 cc.

EXAMPLE 7 (See FIG. 3)

The procedure of Example 3 is repeated except that a 60% ODCB—40% n-$C_{12}$ paraffin is substituted for 25% ODCB—75% n-$C_{12}$ paraffin as the carrier-eluent 25 minutes after the feed is injected. The results show that no pure ethylbenzene is recovered and that the total elution volume is decreased to 65 cc. If gradient elution were started earlier, the p-xylene peak would have eluted earlier with the ethylbenzene peak thereby increasing p-xylene-ethylbenzene overlap and decreasing p-xylene recovery.

EXAMPLE 8 (See FIG. 3)

The procedure of Example 3 was repeated except that 5.0 cc. of the feed used in Example 3 was injected into the column. Results are discussed below.

EXAMPLE 8B (See FIG. 3)

In this part of the Example, the procedure of Example 8A is repeated except that 10.0 cc. of feed containing 5.0 cc. of the feed used in Example 8A and 5.0 cc. of the 25% ODCB—75% n-$C_{12}$ paraffin carrier was injected. The results of Examples 8A and 8B show that the presence of the carrier in the feed slug did not change the observed separation of the $C_8$ aromatic isomers.

EXAMPLE 9

The procedures of Examples 2, 4 and 5 are repeated in a series of runs in which gradient elution techniques herein described are utilized. Results show that paraxylene and ethylbenzene are recovered as product streams and that total elution volumes are reduced relative to the elution volumes found for Examples 2, 4 and 5 described above.

EXAMPLE 10

The procedure of Example 1 is repeated except that barium potassium Y sieve (prepared according to U.S. 3,663,638) is used as the sieve; 25% by weight toluene—75% n-dodecane is used as the initial eluting agent and is changed to 50% by weight toluene 20 minutes after the injection of 2.0 cc. of the $C_8$ aromatic mixture. Results show that while no pure ethylbenzene is recovered, the recovery of paraxylene is effected with total elution volume of less than about 100 cc.

EXAMPLE 11

The procedure of Example 1 is repeated except that modified potassium Y zeolite (prepared according to U.S. 3,686,343) was used as the sieve, 17% by weight orthodichlorobenzene 83% n-dodecane was used as the initial eluting agent and was changed to 60% by weight orthodichlorobenzene 20 minutes after the injection of 1.25 cc. of a 50/50 mixture of ethylbenzene and paraxylene. Results show that pure paraxylene was recovered and that total elution volume was less than 100 cc. No pure ethylbenzene can be recovered from a feed mixture containing all four $C_8$ aromatic isomers since metaxylene elutes with ethylbenzene under these conditions.

EXAMPLE 12

The procedure of Example 2 is repeated except that 20 minutes after the injection of the 2.0 cc. of $C_8$ aromatic isomers, the concentration of toluene is increased from an initial conc. of 25% to 60%. The results show that no pure ethylbenzene is recovered but that pure paraxylene is recovered and the total elution volume is less than 100 cc. a 60% ODCB—40% n-$C_{12}$ paraffin is substituted for 25% ODCB—75% n-$C_{12}$ paraffin as the carrier-eluent 25 minutes after the feed is injected. The results show that no pure ethylbenzene is recovered and that the total elution volume is decreased to 65 cc. If gradient elution were started earlier, the p-xylene peak would have eluted earlier with the ethylbenzene peak thereby increasing p-xylene-ethylbenzene overlap and decreasing p-xylene recovery.

EXAMPLE 8A

The procedure of Example 3 was repeated except that 5.0 cc. of the feed used in Example 3 was injected into the column. Results are found discussed below.

EXAMPLE 8B

In this part of the Example, the procedure of Example 8A is repeated except that 10.0 cc. of feed containing 5.0 cc. of the feed used in Example 8A and 5.0 cc. of the 25% ODCB—75% n-$C_{12}$ paraffin carrier was injected. The results of Examples 8A and 8B show that the presence of the carrier in the feed slug did not change the observed separation of the $C_8$ aromatic isomers.

What is claimed is:

1. In a liquid chromatography separation of two or more components contained in admixture in a feedstream including the steps of:
   (a) contacting the feedstream mixture containing said components to be separated with a bed of crystalline aluminosilicate adsorbent at conditions to effect the selective retention of two or more of the components by said adsorbent;
   (b) passing through said bed an eluent selected from the group consisting of aromatics and substituted aromatics;
   (c) recovering from said bed a stream or streams containing a portion of the less preferentially adsorbed components and;
   (d) recovering a stream or streams substantially enhanced in concentration of said selectively adsorbed components relative to other feedstream components wherein the improvement comprises increasing the strength of the eluent in the liquid carrier during the operation of the aforesaid steps (a) and (b) above to thereby effect the desired separation under conditions resulting in low elution volume to feed ratios.

2. The process of claim 1 wherein said feedstream mixture is a $C_8$ aromatic feedstream containing ethylbenzene and where said crystalline aluminosilicate adsorbent is a potassium Y aluminosilicate.

3. The process of claim 2 wherein said selectively adsorbed components are paraxylene and ethylbenzene.

4. The process of claim 3 wherein the initial concentration of said eluent is about 25% and is increased to a final concentration in the range of from about 50 to about 100% during the operation of steps (a) and (b).

5. A liquid chromatographic process for the separation of paraxylene and ethylbenzene from a $C_8$ aromatic mixture containing ethylbenzene including the steps of:
   (a) contacting the feedstream mixture with a bed containing a potassium Y or ammonium-potassium Y sieve;
   (b) passing through said bed an eluent selected from the group consisting of orthodichlorobenzene and metadiisopropylebenzene;
   (c) recovering from said bed a stream containing a portion of the less preferentially adsorbed components;
   (d) recycling at least a portion of the stream or streams comprising mixtures containing two or more components selected from the group consisting of m-xylene, o-xylene, ethylbenzene and p-xylene; and
   (e) recovering a stream or streams substantially enhanced in concentration of said paraxylene and ethylbenzene relative to the other feedstream components wherein the improvement comprises increasing the strength of the eluent from about 25% to a final concentration in the range of from about 50 to about 100% in eluent-liquid carrier during the operation of the adsorption process.

6. The process of claim 5 wherein the amount of recycle carried out in step (d) is in the range of from about 0 to about 100% of fresh feed volume.

7. In a liquid chromatographic process for the separation of paraxylene from a feedstream containing a $C_8$ aromatic isomer mixture and ethylbenzene including the steps of:
   (a) contacting said feedstream with a bed of crystalline aluminosilicate adsorbent at conditions to effect the selective retention of paraxylene by said adsorbent;
   (b) passing through said bed an eluent selected from the group consisting of aromatics and substituted aromatics;
   (c) recovering from said bed a stream or streams containing a portion of the less preferentially adsorbed feedstream components; and
   (d) recovering a stream or streams substantially enhanced in concentration of paraxylene wherein the improvement comprises increasing the strength of the eluent in the liquid carrier during the operation of the aforesaid steps (a) and (b) above to thereby effect the desired separation of paraxylene under conditions resulting in low elution volume to feed ratios.

8. In a liquid chromatographic process for the separation of paraxylene contained in a $C_8$ aromatic isomer mixture containing ethylbenzene including the steps of:
   (a) contacting the $C_8$ aromatic isomer mixture with a bed containing a type Y molecular sieve selected from the group consisting of potassium-Y, ammonium-potassium-Y and barium-potassium-Y at conditions to effect the selective retention of paraxylene by said sieve;
   (b) passing through said sieve an eluent selected from the group consisting of m-DIPB, ODCB and toluene;
   (c) recovering from said bed a stream or streams containing a portion of the feedstream components less preferentially adsorbed by said sieve;
   (d) recycling a portion of the stream or streams containing a portion of the adsorbed components of said feedstream; and
   (e) recovering a stream or streams substantially enhanced in concentration of paraxylene wherein the improvement comprises increasing the concentration of the eluent in the liquid carrier during the operation of the aforesaid steps (a) and (b) above to thereby effect the desired separation under conditions resulting in low elution volume to feed ratios.

9. The process of claim 8 wherein said less preferentially adsorbed components are selected from the group consisting of m-xylene, o-xylene and ethylbenzene.

References Cited
UNITED STATES PATENTS

| | | | |
|---|---|---|---|
| 2,779,718 | 1/1957 | Capell et al. | 210—31 C |
| 3,699,182 | 10/1972 | Cattanach | 55—67 |
| 3,701,609 | 10/1972 | Bailey | 210—198 C |
| 3,724,170 | 4/1973 | Allen et al. | 55—67 |

JOHN ADEE, Primary Examiner